(12) United States Patent
Dourson et al.

(10) Patent No.: US 7,143,684 B2
(45) Date of Patent: Dec. 5, 2006

(54) HYDRAULIC ACTUATOR HAVING DISC VALVE ASSEMBLY

(75) Inventors: Stephen E. Dourson, Gratis, OH (US); Scott A. Stacey, Centerville, OH (US); Vincent G. Pichon, Blois (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/089,439

(22) Filed: Mar. 24, 2005

(65) Prior Publication Data

US 2005/0211087 A1 Sep. 29, 2005

Related U.S. Application Data

(60) Provisional application No. 60/555,784, filed on Mar. 24, 2004.

(51) Int. Cl.
*F01B 31/00* (2006.01)
*F15B 13/04* (2006.01)

(52) U.S. Cl. .......................... 91/422; 92/183
(58) Field of Classification Search ............... 91/422, 91/436; 92/181 R, 181 P, 183
See application file for complete search history.

(56) References Cited

U.S. PATENT DOCUMENTS

| | | | | |
|---|---|---|---|---|
| 4,375,181 A | * | 3/1983 | Conway ...................... 91/422 |
| 4,478,387 A | * | 10/1984 | Postema ...................... 91/422 |
| 4,830,152 A | * | 5/1989 | Rauert et al. .......... 188/322.15 |
| 5,615,756 A | * | 4/1997 | Grundei et al. ........ 188/322.15 |
| 6,089,142 A | * | 7/2000 | Adrian et al. .............. 92/181 P |
| 6,129,005 A | * | 10/2000 | Asadi et al. .................. 92/183 |
| 6,540,052 B1 | * | 4/2003 | Fenn et al. ............ 188/322.15 |

* cited by examiner

*Primary Examiner*—Edward K. Look
*Assistant Examiner*—Michael Leslie
(74) *Attorney, Agent, or Firm*—Scott A. McBain

(57) ABSTRACT

A hydraulic actuator comprises piston that divides the interior into a piston chamber and a rod chamber and a valve disc assembly to regulate flow of hydraulic fluid between the piston chamber and the rod chamber through a passage in the piston. The disc valve assembly includes a washer, a valve pack that includes at least one flexible disc valve, and a spacer arrangement spacing the valve pack apart from the washer. During operation, the valve pack flexes to open and close the passage. The spacer arrangement includes a first support point supporting the valve pack relative to the washer and at least one second support point spaced apart from the flexible portion of the disc valve pack. In the open position, the valve pack engages the second support point to reduce stress build-up at the first support point, thereby reducing work fatigue of the valve disc and extending the useful life of the hydraulic actuator.

7 Claims, 2 Drawing Sheets

HYDRAULIC ACTUATOR HAVING DISC VALVE ASSEMBLY

CROSS REFERENCE TO RELATED APPLICATION

This application claims the benefit of U.S. Provisional Application No. 60/555,784, filed Mar. 24, 2004, which is incorporated herein by reference.

TECHNICAL FIELD OF INVENTION

This invention relates generally to hydraulic actuators, and more particularly to a to hydraulic actuator that includes a disc valve assembly.

BACKGROUND OF INVENTION

A hydraulic mount for a vehicle comprises a tubular housing having a mounting bracket at one end, a piston disposed in the housing, and a rod connected to the piston and extending through a seal at the other end of the housing. The piston divides the housing into a piston chamber and a rod chamber. The rod includes a second mounting bracket at the end outside the housing. Hydraulic fluid is pumped into and out of the chambers to move the piston relative to the housing and thereby adjust the distance between the mounting brackets. The hydraulic actuator is installed by attaching the mounting brackets to the stabilizer bar of the wheel assembly and the body, which represents the sprung mass. During use, in response to sensors that detect vehicle roll, the system adjusts the hydraulic fluid in the piston chamber and the rod chamber to length or shorten the actuator and maintain a stable orientation for the vehicle.

Primary fluid flow in an actuator is through external connections to a pump. This is in marked contrast to a damper, also referred to as a shock absorber, wherein the hydraulic fluid is sealed within the housing and fluid flows through internal passages in response to road input. It is known to provide a passage in the piston of the hydraulic actuator to allow limited flow between the piston chamber and the rod chamber. The passage is normally open, and includes a disc valve assembly to close the passage to prevent excessive flow that would interfere with the desired operation of the actuator as determined by the pumped fluid. FIG. 1 shows a conventional disc valve assembly for this purpose. Piston 10 comprises a passage 12 having an enlarged outlet 14 that allow fluid flow in the direction of arrow 15 from the piston chamber to the rod chamber. The assembly includes a disc pack 16 that includes one or more flexible discs, for example discs 18 and 20 in FIG. 1. The assembly includes a spacer 24 between the disc pack and the piston to provide a gap between the free end 22 and the piston 10, so that the valve is normally open to provide communication between the fluid in the chambers with limited flow. In response to excessive fluid pressure in the rod chamber, valve discs 18 and 20 flex toward the piston in the direction of arrow 26, whereupon disc 20 engages the piston to close the valve. In response to excessive pressure in the piston chamber, it is desired to further open the valve to facilitate fluid flow. This is accomplished by flexing valve discs away from the piston, in the direction of arrow 28. A washer 30 limits the flexing to prevent the discs from permanent deformation. A spacer 32 provides clearance to the discs to flex. Circumstances may arise where the fluid pressure to open the valve may create stresses that exceed the yield strength of the disc material and deform the disc. Moreover, repeated flexure may exceed the fatigue limit of the disc material. As a result, the valve may fail to close, interfering with the proper operation of the hydraulic actuator.

Therefore, a need exists for a hydraulic actuator having an improved disc valve assembly that reduces stresses within the valve discs during flexure, and thereby extends the useful life of the actuator.

SUMMARY OF THE INVENTION

In accordance with this invention, a hydraulic actuator comprises a housing, a piston reciprocal within the housing and dividing the interior thereof into a piston chamber and a rod chamber, and a rod connected to said piston and extending through the rod chamber. The piston comprising a passage having an opening to allow hydraulic fluid flow between the piston chamber to the rod chamber. The hydraulic actuator further comprises a disc valve assembly to open and close the passage. The disc valve assembly includes a washer mounted to the piston overlying the opening, spaced apart therefrom. A valve pack is mounted to the rod between the washer and the piston and includes at least one disc valve and preferably at least two disc valves, each having a flexible portion remote from the extension. Still further, the disc valve assembly includes a spacer arrangement that spaces the flexible portion of the disc valve apart from the washer. The spacer arrangement includes a first support point supporting the valve pack relative to the washer and at least one second support point spaced apart from the flexible portion of the disc valve when the valve pack is in an unflexed position. During operation, the valve pack flexes between a valve closed position and a valve open position. In the closed position, the valve pack closes the opening to prevent hydraulic fluid flow from the rod chamber to the piston chamber. In the open position, the flexible portion of the valve disc engages the washer to fully open the valve assembly to allow hydraulic fluid flow from the piston chamber to the rod chamber. In accordance with this invention, when the flexible portion flexes to the open position, the valve disc engages the second support point. This reduces stress build-up within the valve pack, particularly stresses that might otherwise be concentrated about the first support point, and thereby extends the useful life of the valve disc assembly and thus the hydraulic actuator.

BRIEF DESCRIPTION OF DRAWINGS

This invention will be further described with reference to the accompanying drawings in which.

DETAILED DESCRIPTION OF INVENTION

Figure 2:
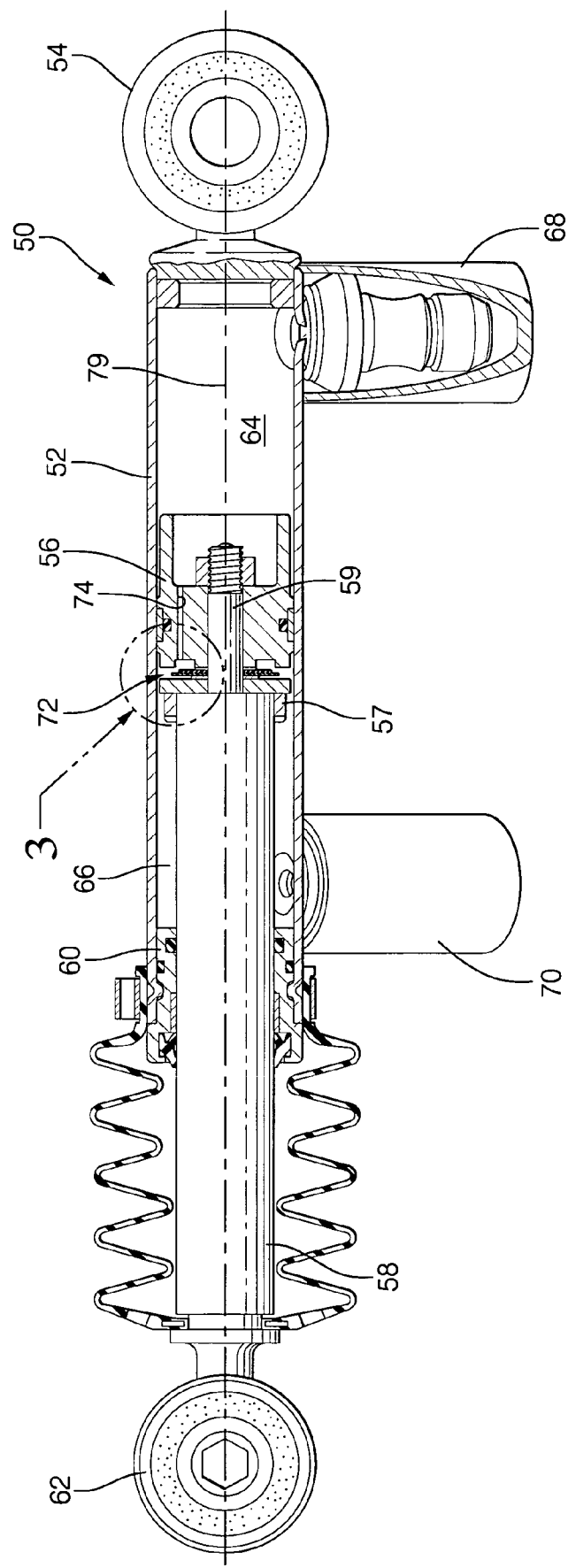
FIG. 2 is a cross sectional view of a hydraulic actuator in accordance with this invention.

In accordance with a preferred embodiment of this invention, referring to FIG. 2, a hydraulic actuator 50 comprises a tubular housing 52 having a mounting bracket 54 at one end. A rod 58 extends through a seal 60 in the opposite end of housing 52 and includes a mounting bracket 62 at the external end thereof. A piston 56 is reciprocally mounted within the housing and is connected to a tenon or extension 59 on rod 58. Piston 56 divides the interior of housing 52 into a first chamber 64, referred to as the piston chamber, and a second chamber 66, referred to as the rod chamber. Actuator 50 includes fitting 68 for connecting the piston chamber to a reservoir and a pump (not shown) for pumping hydraulic fluid into and out of the piston chamber, and fitting 70 connecting to the rod chamber for pumping hydraulic fluid into and out of the rod chamber. A polymeric rebound bumper 57 is disposed about rod 58 to provide cushioning in the event of maximum extension of the rod. It is appreciated that actuator 50 is mainly of conventional construction, except as modified in accordance with this invention, and that the installation and operation is known in the art.

Figure 3:
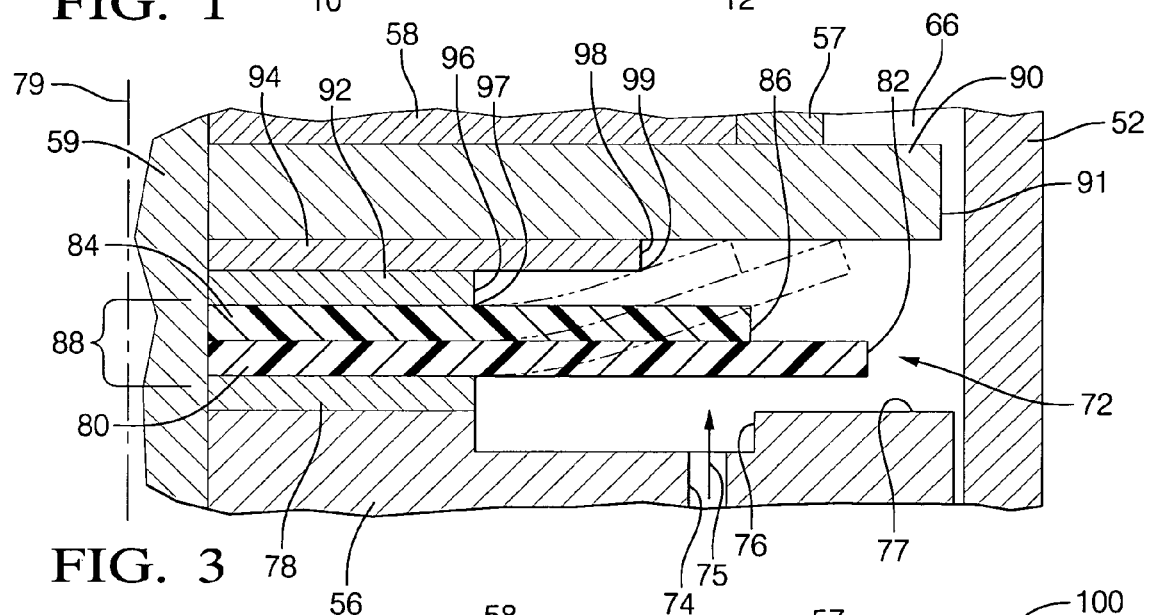
FIG. 3 is a cross sectional view of a portion of the hydraulic actuator in FIG. 2 within circle 3, showing details of a disc valve assembly in accordance with a first embodiment.

In accordance with this invention, actuator 50 includes a valve disc assembly 72, the details of which are shown in FIG. 3. Assembly 72 comprises a series of annular elements arranged in a stack on extension 59 of rod 58. Piston 56, also mounted on extension 59, includes a passage 74 having an enlarged outlet 76, and a seal surface 77 outboard of outlet 76. As used herein, inboard and outboard designate radial positions relative to a central axis 79 of piston 56. Although FIG. 3 depicts a single passage 74, it will be appreciated that the piston preferably comprises a plurality of passages spaced apart in a circular arrangement about axis 79, whereas outlet 76 is preferably a circular groove about the axis that receives and distributes uniformly fluid from the passages.

A spacer 78 is mounted adjacent the piston inboard from outlet 76. A first flexible valve disc 80 is mounted against spacer 78 overlying the outlet 76 and includes a free end 82 that overlies seal surface 77 spaced apart as a result of spacer 78. A second flexible valve disc 84 is adjacent first valve disc 80 and includes a free end 86. Valve discs 80 and 84 form a disc pack 88 in the assembly. Discs 80 and 84 are formed of tempered and polished, ordinary rolled and specially flattened carbon spring steel strip adapted to elastically deform in a manner suitable for liquid seal flapper valves. In general, it is preferred to provide multiple discs having abutting surfaces that slide to enhance flexure of the pack, and having thicknesses that combine to increase the strength of the pack. Alternately, the disc pack may be formed of only a single valve disc.

A stop washer 90 is mounted onto extension 59 to limit flexure of the valve discs away from outlet 76. Washer 90 includes an end 91 spaced apart from the interior surface of housing 52 to provide a passage communicating with rod chamber 66. First and second spacers 92, 94 are provided intermediate the valve pack 88 and washer 90 to provide clearance for flexure of the valve pack. Spacer 92 is adjacent valve disc 84 and includes an end 96 inboard from end 86. Spacer 94 is adjacent washer 90 and comprises an end 98 intermediate end 96 and end 86.

During operation, valve pack 88 flexes to open and close outlet 76 to allow or prevent fluid flow between piston chamber 64 and rod chamber 66. In the unflexed position shown in FIG. 3, valve discs 82 and 84 are planar, and valve disc 82 is spaced apart form sealing surface 77 of piston 56. This provides a partially open position to allow restricted fluid communication between the piston chamber 64 and the rod chamber 66. The restricted fluid communication eliminates residual pressure imbalances that might otherwise inhibit flexure to open or close the valve, thereby providing a faster valve response time. This also reduces fluid cavitation that might other wise result in aeration and adversely affect operation of the hydraulic actuator.

During operation, in response to certain road conditions, hydraulic fluid is pumped into the rod chamber and withdrawn from the piston chamber to contract the hydraulic actuator. In the event of increased pressure in the rod chamber relative to the piston chamber, for example, due to road input forces that would tend to extend the actuator, valve pack flexes to urge end 82 into contact with sealing surface 77 and thereby closes the valve. This mitigates the contrary movement induced by the road input and also reduces fluid cavitation.

During operation, in response to certain road conditions, hydraulic fluid is pumped into the piston chamber and withdrawn from the rod chamber to extend the hydraulic actuator. In the event of increased pressure in piston chamber 64 relative to rod chamber 66, for example, due to road input forces that would tend to contract the actuator, valve pack 88 flexes into the full open position shown in phantom in FIG. 3. This increases the clearance between sealing surface 77 and valve disc 80 and thereby promotes flow through passage 74 from the piston chamber to the rod chamber, in the direction indicated by arrow 75. By promoting fluid flow from the piston chamber to the rod chamber, fluid cavitation is reduced in the rod chamber. In view of the relatively large volume of the piston chamber, the need to resist contrary actuator movement is reduced.

Figure 1:
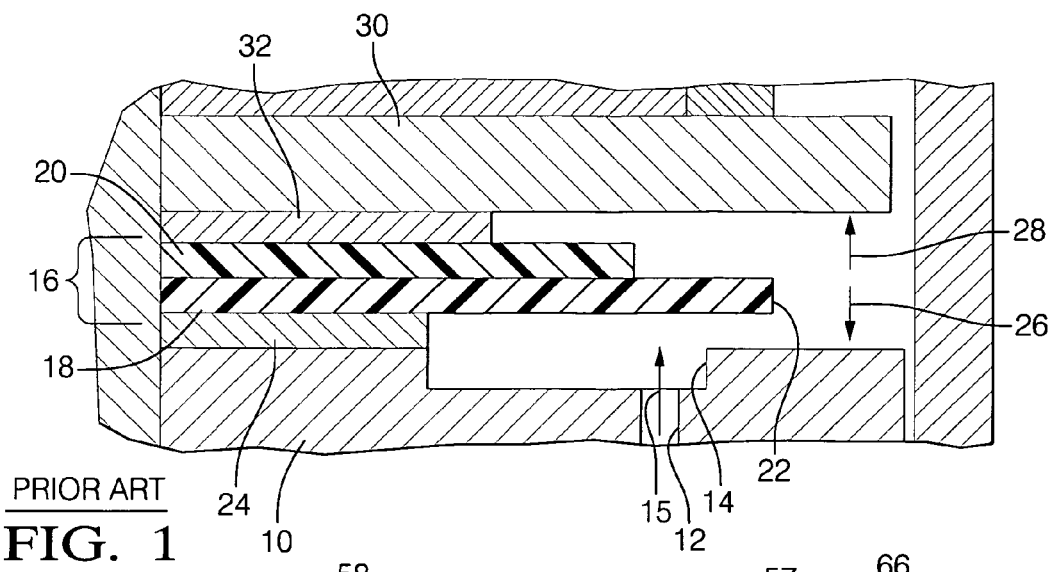
FIG. 1 is a cross sectional view of a conventional disc valve assembly.

It is significant that, in the open position shown in FIG. 3 in phantom, valve disc 84 engages the edge of end 98 of spacer 94. While not limited to any particular theory, referring to FIG. 1, in a conventional disc valve assembly, when the valve discs flex to the fully open position, a single support point is provided, which corresponds to the point of contact between the edge of spacer 32 and the adjacent valve disc 18. Flexing produces stresses that are concentrated in the region about the single support point, and, over time, leads to failure of the valve disc assembly. As used herein, support point refers to the intersection of the spacer and the valve disc in the plane through the axis, although it is understood that the spacer comprises a circular perimeter to provide support points in the several planes through axis 79. In accordance with this invention, referring to FIG. 3, the spacer arrangement includes a first support point 97 at the edge of the perimeter of spacer 92 in contact with the valve disc 82, and a second support point 99 at the edge of disc valve 94. In contrast to the continuous contact at first support point, the second support point is spaced apart from valve disc 84 in the unflexed position, but contacts the valve disc in the fully opened position. The contact at the second support point reduces stress at the first support point. By reducing stress build-up at the principal support point of contact, the useful life of the valve disc assembly is extended.

Thus, this invention provided a disc valve assembly for a hydraulic actuator that that reduces maximum stress levels in the disc pack during flexing and thereby extends the useful life of the valve disc assembly and thus the actuator. This is accomplished by providing a second support point to engage the valve disc pack during flexing and reduce stress level about the primary support point. It is a significant advantage of the preferred embodiment that the second point of contact is provided by a second spacer appropriately sized so that the edge thereof extends beyond the spacer that provides the primary support for flexing. Such annular components are economical and readily available in a range of sizes, without requiring special tooling. The thicknesses of the compound spacers may be selected to provide a desired opening clearance to assure optimum fluid flow, while minimizing stress in the disc valve pack. Moreover, the valve assembly of this invention is adapted to provide hydraulic flow having a smoother pressure transition and minimize noise associated with opening of the valve.

Figure 4:
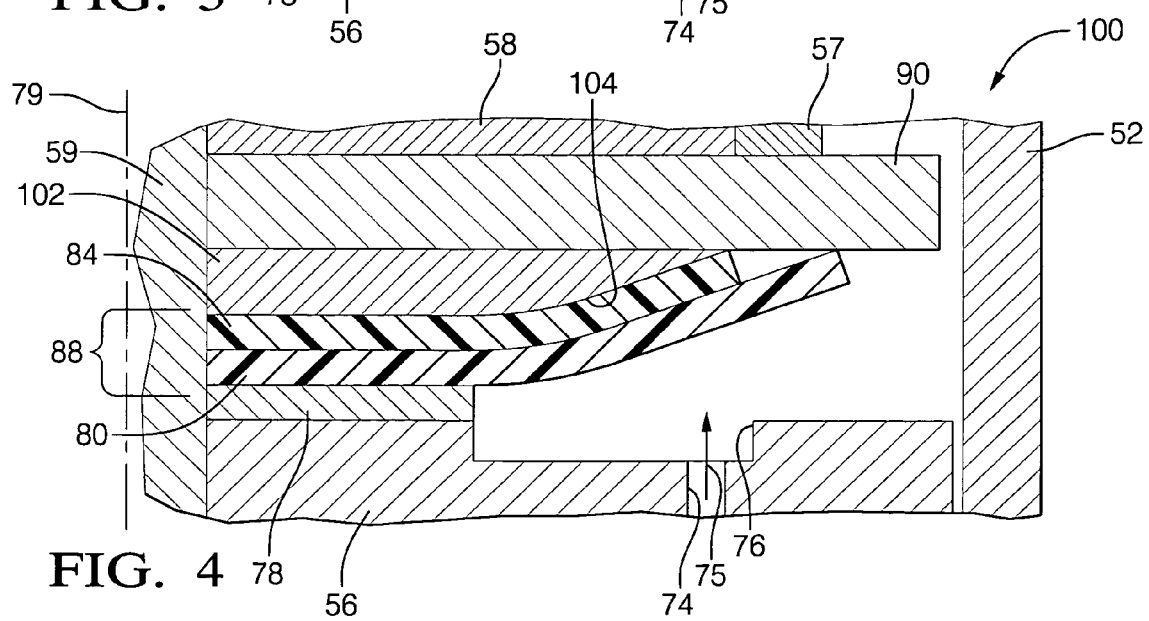
FIG. 4 is a cross sectional view of a disc valve assembly in accordance with a second embodiment of this invention.

In the embodiment in FIG. 3, the valve assembly is modified to include an annular spacer of a type that is readily available and provide a second contact point during flexing. In accordance with an alternate embodiment of this invention, a disc valve assembly may include a contoured surface that provide multiple points of contact to distribute stresses over an area, as opposed to a single point of contact. Referring to FIG. 4, wherein like elements to FIG. 3 are identified with the same reference numerals, a valve assembly 100 comprises a spacer 102 disposed between valve pack 88 and washer 90 and having a contoured surface 104. During opening of the valve, disc valve 84 flexes against contoured surface 104 to distribute the stresses, thereby extending the useful life of the valve assembly.

While this invention has been described in terms of the preferred embodiments thereof, it is not intended to be so limited, but rather only to the extent set forth in the claims that follow.

We claim:

1. A hydraulic actuator comprising
   a housing having an interior,
   a rod extending within said housing and comprising an extension within the interior;
   a piston mounted on the extension and reciprocal within said interior, said piston dividing said interior into a piston chamber and a rod chamber, said piston comprising a passage having an opening and adapted for hydraulic fluid flow between said piston chamber and said rod chamber; and
   a disc valve assembly comprising
   a washer mounted to said extension overlying the opening and spaced apart therefrom;
   a valve pack mounted to the extension between said washer and the piston, said valve pack comprising at least one disc valve having a flexible portion remote from the extension and having an unflexed position; and
   a spacer arrangement disposed between said at least one disc valve and said washer to space said flexible portion of said at least one disc valve apart from the washer, said spacer comprising a first support point supporting the valve pack relative to said washer and at least one second support point spaced apart from the flexible portion of the disc valve in said unflexed position;
   wherein said valve pack is adapted to flex between a valve closed position wherein the opening is closed to prevent hydraulic fluid flow from the rod chamber to the piston chamber and an open position wherein the flexible portion engages the washer to open said valve assembly to allow hydraulic fluid flow from the piston chamber to the rod chamber, and further wherein the second support point engages the disc valve pack in the open position to reduce stress attributable to said flexing at said first support point;
   wherein the spacer arrangement comprises a first element adjacent the disc valve pack and including the first support point, and second element adjacent the washer and comprising the second support point.

2. The hydraulic actuator in claim 1, wherein the valve pack comprises multiple disc valves in a stack arrangement between the piston and the washer.

3. The hydraulic actuator in claim 1, wherein the valve pack includes a disc valve adjacent the spacer arrangement in contact with said first support point and adapted to contact said second support point in said open position.

4. The hydraulic actuator in claim 1, wherein the piston includes a seal surface outboard the opening for engaging the valve pack in the valve closed position.

5. The hydraulic actuator in claim 4, wherein the seal surface is spaced apart from the flexible portion in the unflexed position.

6. The hydraulic actuator in claim 1, wherein the opening is enlarged relative to the passage.

7. A hydraulic actuator comprising
   a housing having an interior,
   a rod extending within said housing and comprising an extension within the interior;
   a piston mounted on the extension and reciprocal within said interior, said piston dividing said interior into a piston chamber and a rod chamber, said piston comprising a passage having an opening and adapted for hydraulic fluid flow between said piston chamber and said rod chamber; and
   a disc valve assembly comprising
   a washer mounted to said extension overlying the opening and spaced apart therefrom;
   a valve pack mounted to the extension between said washer and the piston, said valve pack comprising at least one disc valve having a flexible portion remote from the extension and having an unflexed position; and
   a spacer arrangement disposed between said at least one disc valve and said washer to space said flexible portion of said at least one disc valve apart from the washer, said spacer comprising a first support point supporting the valve pack relative to said washer and at least one second support point spaced apart from the flexible portion of the at least one disc valve in said unflexed position;
   wherein said valve pack is adapted to flex between a valve closed position wherein the opening is closed to prevent hydraulic fluid flow from the rod chamber to the piston chamber and an open position wherein the flexible portion engages the washer to open said valve assembly to allow hydraulic fluid flow from the piston chamber to the rod chamber, and further wherein the second support point engages the disc valve pack in the open position to reduce stress attributable to said flexing at said first support point;
   wherein the spacer arrangement comprises a contoured surface that includes the second support port.

* * * * *